United States Patent
Lane, Jr.

[11] Patent Number: 6,024,377
[45] Date of Patent: Feb. 15, 2000

[54] LOW MOUNT AIRBAG DEPLOYMENT SYSTEM

[75] Inventor: Wendell C. Lane, Jr., Romeo, Mich.

[73] Assignee: Breed Automotive Technology, Inc., Lakeland, Fla.

[21] Appl. No.: 08/934,817

[22] Filed: Sep. 22, 1997

[51] Int. Cl.[7] ................................................. B60R 21/20
[52] U.S. Cl. ....................................... 280/728.3; 280/732
[58] Field of Search ................................. 280/728.3, 732, 280/728.2

[56] References Cited

U.S. PATENT DOCUMENTS

| | | | |
|---|---|---|---|
| 5,306,042 | 4/1994 | Frank | 280/728.3 |
| 5,344,184 | 9/1994 | Keeler et al. | 280/732 X |
| 5,385,366 | 1/1995 | Frank et al. | 280/728.3 |
| 5,553,887 | 9/1996 | Karlow et al. | 280/730.2 |
| 5,645,295 | 7/1997 | White, Jr. et al. | 280/730.2 |
| 5,690,354 | 11/1997 | Logan et al. | 280/728.2 |

FOREIGN PATENT DOCUMENTS

3279052  12/1991  Japan ................................. 280/728.3

Primary Examiner—Christopher P. Ellis
Attorney, Agent, or Firm—Markell Seitzman

[57] ABSTRACT

A low-mount airbag restraint system capable of deploying a single airbag (34) to protect the upper and lower body portions of a seat occupant. The low-mount airbag restraint system includes a crash management system (10) and an airbag deployment assembly (12) mounted in a lower portion of a dashboard (18) or a vehicle door (120). The airbag deployment assembly (12) includes a housing (22) and an airbag module (24) disposed in the housing (22). The airbag module (24) includes an airbag (34) mounted to a manifold (32) and an inflator (30) mounted within the manifold (34). Activation of the inflator (30) causes housing (22) to move from a closed position to an open position for establishing a deployment aperture through which the airbag (34) is deployed.

13 Claims, 10 Drawing Sheets

LOW MOUNT AIRBAG DEPLOYMENT SYSTEM

BACKGROUND OF THE INVENTION

1. Technical Field

The present invention relates generally to an airbag restraint system for use in a motor vehicle and, more specifically, an airbag deployment assembly for use in conjunction with low mount airbags.

2. Discussion

Many motor vehicles are now equipped with an airbag restraint system for protecting a vehicle occupant in frontal crash situations. Typically, the airbag restraint system includes a driver-side airbag mounted in the steering wheel and may also include a passenger-side airbag mounted in the upper dashboard. In addition, recent attention has been directed to the incorporation of side airbags and low-mount airbags into the airbag restraint system. Side airbags are mounted in the door or vehicle seat and are deployed in response to side impact conditions. In contrast, low-mount airbags are typically mounted in the lower dashboard and are deployed to protect the lower body portion of the seat occupant. These secondary airbags are provided in addition to the primary driver-side and passenger-side airbags.

In conventional airbag restraint systems, inflation of the airbag causes a hinged door to rupture along a frangible seam and permit deployment of the airbag toward the seat occupant. Unfortunately, this conventional hinged door deployment technique is not generally applicable to low-mount airbags since contact between the hinged door and the seat occupant during a collision may cause injury. Thus, a need exists to develop alternative airbag deployment techniques which are applicable for use with low-mount airbags.

SUMMARY OF THE INVENTION

It is an object of the present invention to provide an airbag restraint system for use in association with low-mount airbags which overcomes the shortcomings of conventional low-mount airbag restraint systems.

An additional object of the present invention is to provide a low-mount airbag restraint system capable of deploying a single airbag between the seat occupant and the dashboard in response to detection of a frontal collision.

A further object of the present invention is to provide a low-mount airbag restraint system equipped with an airbag deployment assembly which can be mounted in the lower dashboard or the lower door panel of a motor vehicle.

According to one embodiment of the present invention, the airbag deployment assembly includes an airbag module which is retained within a jaw-type housing. The airbag module includes an airbag and an inflator. The jaw-type housing is pivotably movable from a closed position to an open position to define a deployment aperture through which the airbag can be deployed. In response to detection of a collision, the inflator is activated to inflate the airbag and move the housing to its open position.

According to another embodiment of the present invention, the airbag deployment assembly includes an airbag module which is retained in a drawer unit. Activation of the inflator in response to detection of a vehicular collision causes forward sliding movement of the drawer unit, thereby defining a deployment aperture through which the airbag is deployed.

According to a third embodiment of the present invention, an airbag module is mounted in the lower portion of the vehicle door. The airbag is deployed outwardly and upwardly into the passenger compartment such that the airbag extends generally from the occupant's lower extremities to the occupant's upper extremities. Using this arrangement, the airbag module can be mounted in the vehicle door, or alternatively, in a side wall location of a van or two-door vehicle so as to protect rear seat passengers.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The above-noted objects and features of the present invention will become more fully understood from the following detailed description and the accompanying drawings in which.

DETAILED DESCRIPTION OF THE PREFERRED EMBODIMENT

Figure 1:
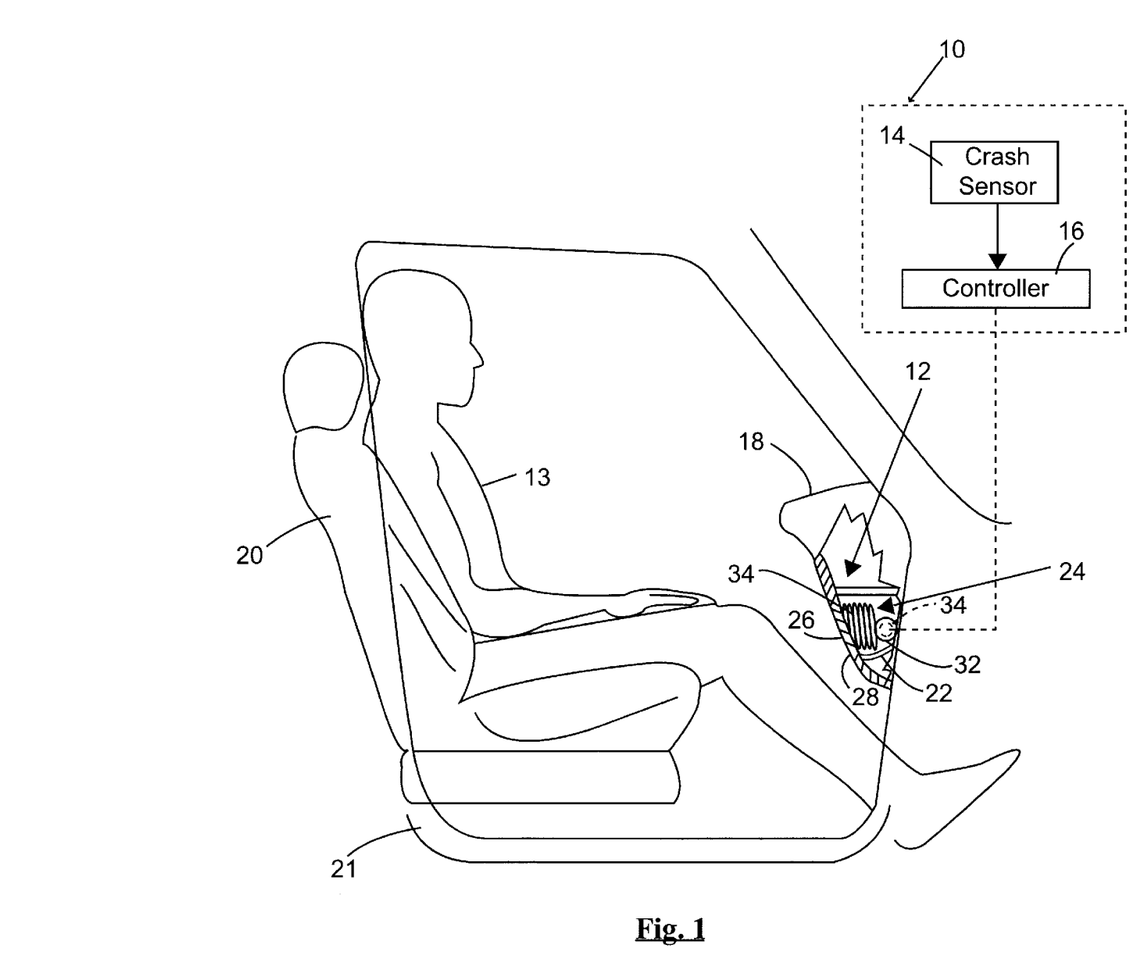
FIG. 1 is an environmental view of the interior of an exemplary motor vehicle showing the airbag deployment assembly of the present invention mounted in the lower dashboard.
Figure 2:
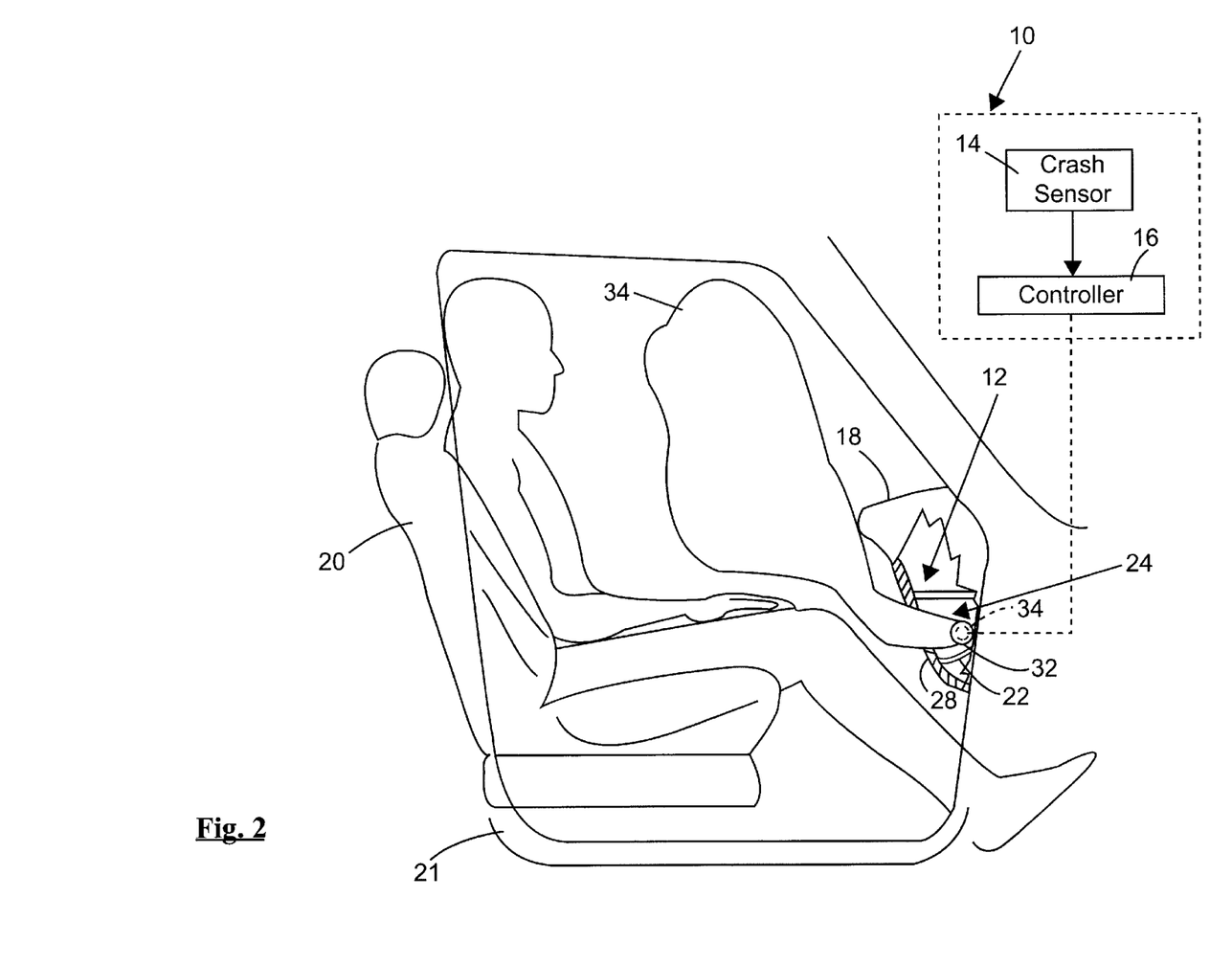
FIG. 2 is an environmental view, similar to FIG. 1, showing deployment of the airbag in a direction generally outward and upward relative to the dashboard.

In general, the present invention is directed to a low-mount airbag restraint system which is capable of deploying a single airbag to protect the upper and lower body portions of a seat occupant during a frontal collision. Referring specifically to FIGS. 1 and 2, the low-mount airbag restraint system is shown to include a crash management system 10 and an airbag deployment assembly 12. Crash management system 10 is shown schematically to include a crash sensor 14 and a controller 16. Airbag deployment assembly 12 is mounted in a lower portion of a dashboard 18, shown partially broken-away for clarity, such that airbag deployment assembly 12 is positioned in front of a seat occupant 13 seated in a passenger-side seat 20 adjacent a side 21 of a motor vehicle. Airbag deployment assembly 12 includes a housing 22 and an airbag module 24 disposed within housing 22. Housing 22 includes a front panel 26 which is positioned within an aperture 28 formed in dashboard 18 such that front panel 26 forms a continuous decorative surface with respect to the remainder of dashboard 18. As is conventional, airbag module 24 includes an airbag 34 which is in fluid communication with an inflator 30. Depending upon the type of inflator used the inflator 30 may be positioned within an optional manifold, of known construction. As is known in the art the manifold may include a plurality of exit ports across its length which functions to more evenly distribute the flow of inflation gasses into the airbag. In operation, controller 16 activates inflator 30 in response to a signal from crash sensor 14 indicating the occurrence of a vehicular frontal collision.

As shown in FIG. 1, airbag deployment assembly 12 is in a non-actuated condition with airbag 34 retained in a folded position within housing 22. In contrast, FIG. 2 illustrates airbag deployment assembly 12 in an actuated condition with airbag 34 inflated by the gases generated in response to activation of inflator 30. In its fully deployed position, airbag 34 extends generally upwardly and outwardly from dashboard 18 from an area generally below the seat occupant's knees to above the seat occupant's head. As such, airbag 34 is capable of protecting the upper and lower body portions of the seat occupant. As will be detailed for each of the following embodiments of the present invention, activation of an inflator causes movement of housing 22 from a closed position to an open position for causing airbag deployment assembly 12 to be shifted from its non-actuated condition into its actuated condition.

Figure 3:
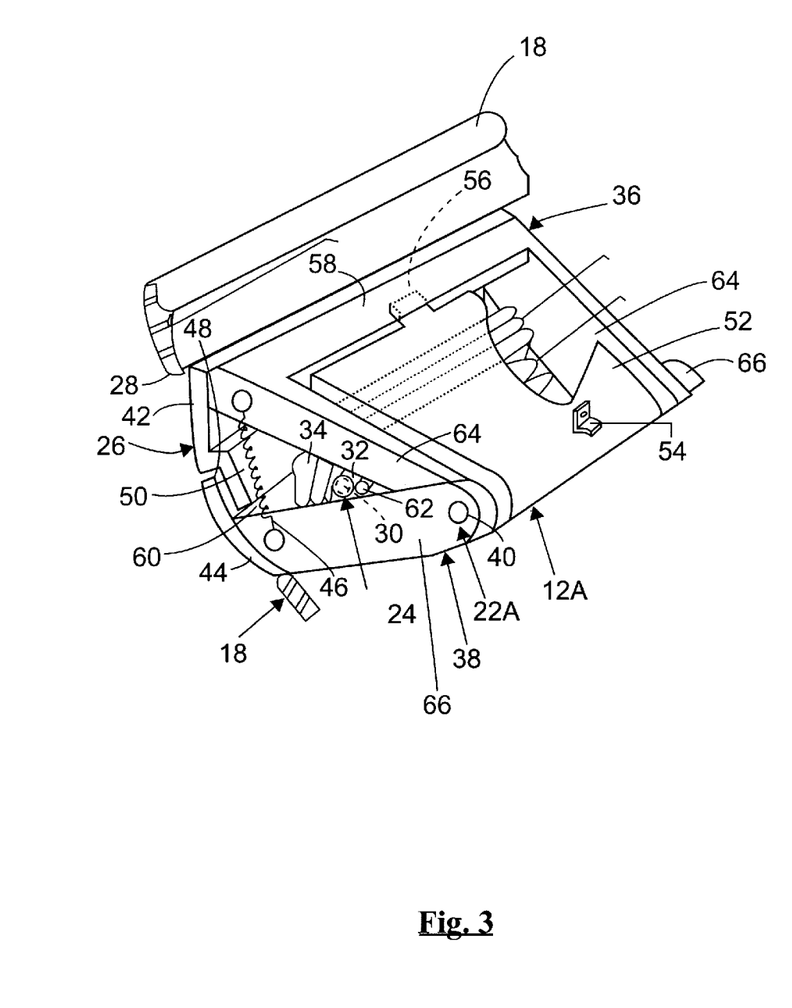
FIG. 3 is a perspective view of an airbag deployment assembly according to one embodiment of the present invention in a non-actuated condition.
Figure 4:
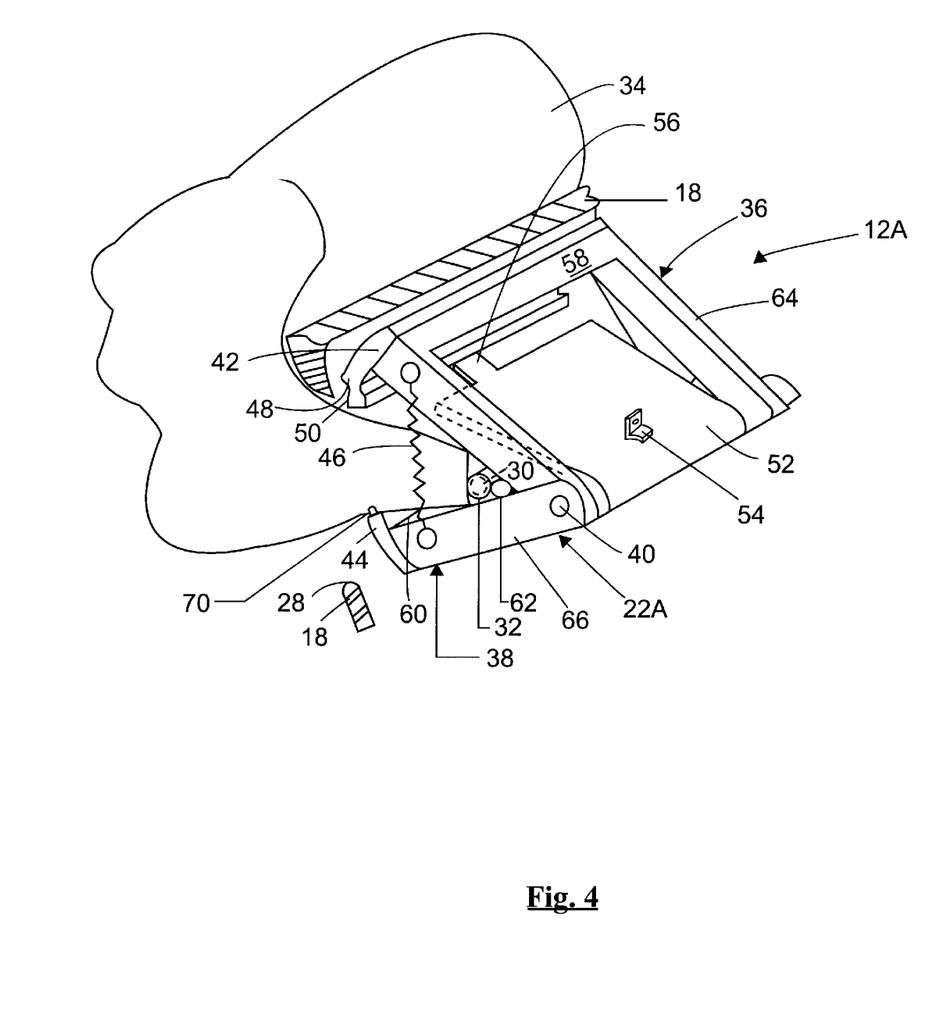
FIG. 4 is a view, similar to FIG. 3, showing the airbag deployment assembly in an actuated condition.

With particular reference now to FIGS. 3 and 4, a first embodiment of airbag deployment assembly 12A is shown with a jaw-like housing 22A comprised of an upper pivot bracket 36 which is pivotably mounted to a lower pivot bracket 38 via a hinge pin 40. Front panel 26 is defined by an upper door 42 fixed to upper pivot bracket 36 and a lower door 44 fixed to lower pivot bracket 38. A pair of springs 46 (one shown) are located on the opposite lateral sides of housing 22A and interconnect upper pivot bracket 36 to lower pivot bracket 38. Springs 46 function to normally urge housing 22A to the closed position shown in FIG. 3 such that airbag deployment assembly 12A is defined as being in its non-actuated condition. With housing 22A in its closed position, lower door 44 is in close proximity to a shoulder segment 48 of upper door 42 and in overlapping relation to a flange segment 50 thereof. To maintain the desired angularity between pivot brackets 36 and 38 when housing 22A is in its closed position, airbag deployment assembly 12A also includes a generally V-shaped retainer plate 52 which is rigidly mounted to dashboard 18 via a mounting flange 54. In particular, stop tabs 56 are formed at the terminal ends of retainer plate 52 and are adapted to engage a cross member 58 of upper pivot bracket 36 and a cross member 60 of lower pivot bracket 38 when housing 22A is in its closed position due to the biasing of springs 46.

With continued reference to FIGS. 3 and 4, airbag module 24 is shown positioned within retainer plate 52 so as to be located behind doors 42 and 44. In addition, an actuator, such as shaft 62, is secured to manifold 32 and is shown to extend outwardly between upper pivot bracket 36 and lower pivot bracket 38. Specifically, the opposite ends of shaft 62 extend outwardly beyond the laterally-spaced side rails 64 of upper pivot bracket 36 and the laterally-spaced side rails 66 of lower pivot bracket 38.

In operation, when crash sensor 14 of the vehicle's crash management system 10 senses a vehicular collision of sufficient magnitude to actuate airbag module 24, a signal is sent by controller 16 to activate inflator 30 which generates gas that is distributed through discharge ports in manifold 32, if used or which flows directly from the discharge ports of the inflator 30, to inflate airbag 34. Initial inflation of airbag 34 with housing 22A in its closed position causes movement of loosely positioned manifold 32 (and/or inflator 30) in response to the reaction forces generated by the expanding air bag 34 toward hinge pin 40 such that the opposite ends of shaft 62 are forced into engagement with the edge surfaces of side rails 64 and 66 of upper pivot bracket 36 and lower pivot bracket 38, respectively. This engagement results in a wedging or camming action which causes pivot arms 36 and 38 to pivot about hinge pin 40 for moving housing 22A from its closed position (FIG. 3) to its open position (FIG. 4), thereby creating a deployment aperture 70 between doors 42 and 44 through which airbag 34 is subsequently deployed. As noted in reference to FIG. 2, airbag 34 is thereafter inflated for deployment in front of dashboard 18 to provide a full body airbag restraint to the seat occupant. Thus, the jaw-like structure of housing 22A creates deployment aperture 70 without use of a hinged door entering into the vehicle's passage compartment. Alternatively, it is contemplated that shaft 62 can be eliminated such that manifold 32 or inflator 30, engages edge surface of pivot brackets 36 and 38 for causing movement of housing 22A to its open position.

As an alternative to the dual pivot construction described, one of upper pivot bracket 36 and lower pivot bracket 38 could be fixed against pivotal movement such that only the other one thereof pivots in response to the wedging action caused by activation of inflator 30. In either arrangement, pivotal movement of the movable pivot bracket(s) will create a deployment aperture 70 through which airbag 34 can be deployed.

Figure 5:
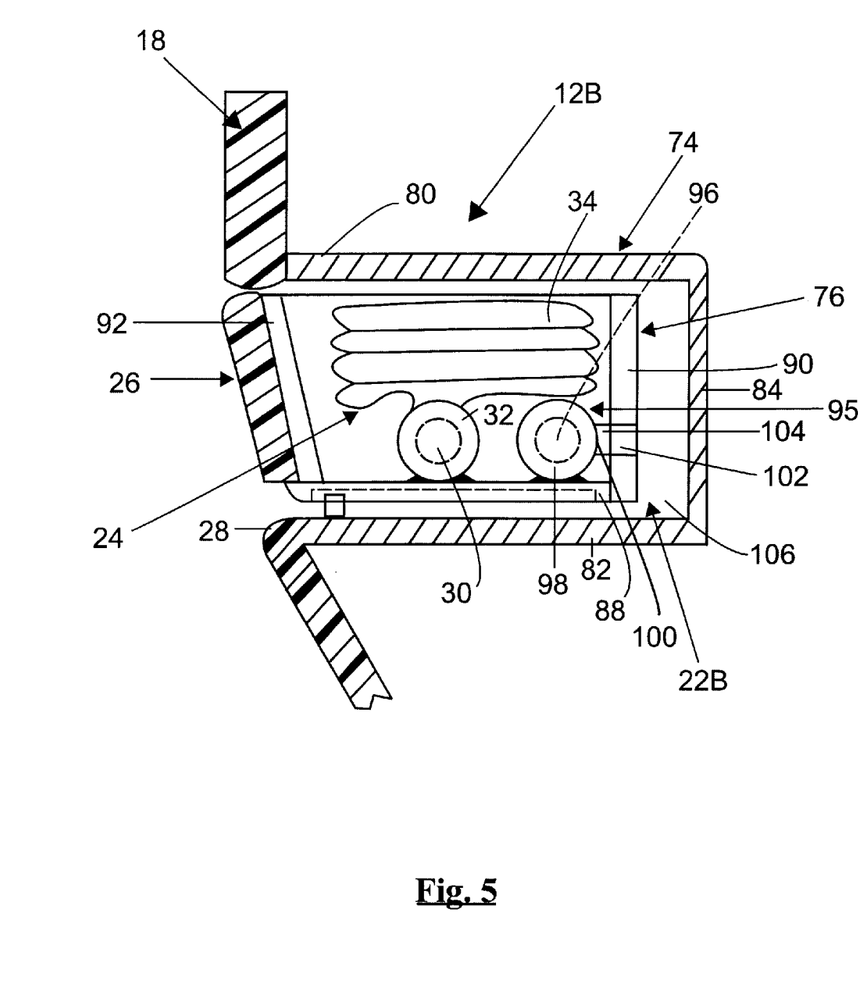
FIG. 5 is a side view of an airbag deployment assembly according to an alternative embodiment of the present invention in a non-actuated condition.
Figure 6:
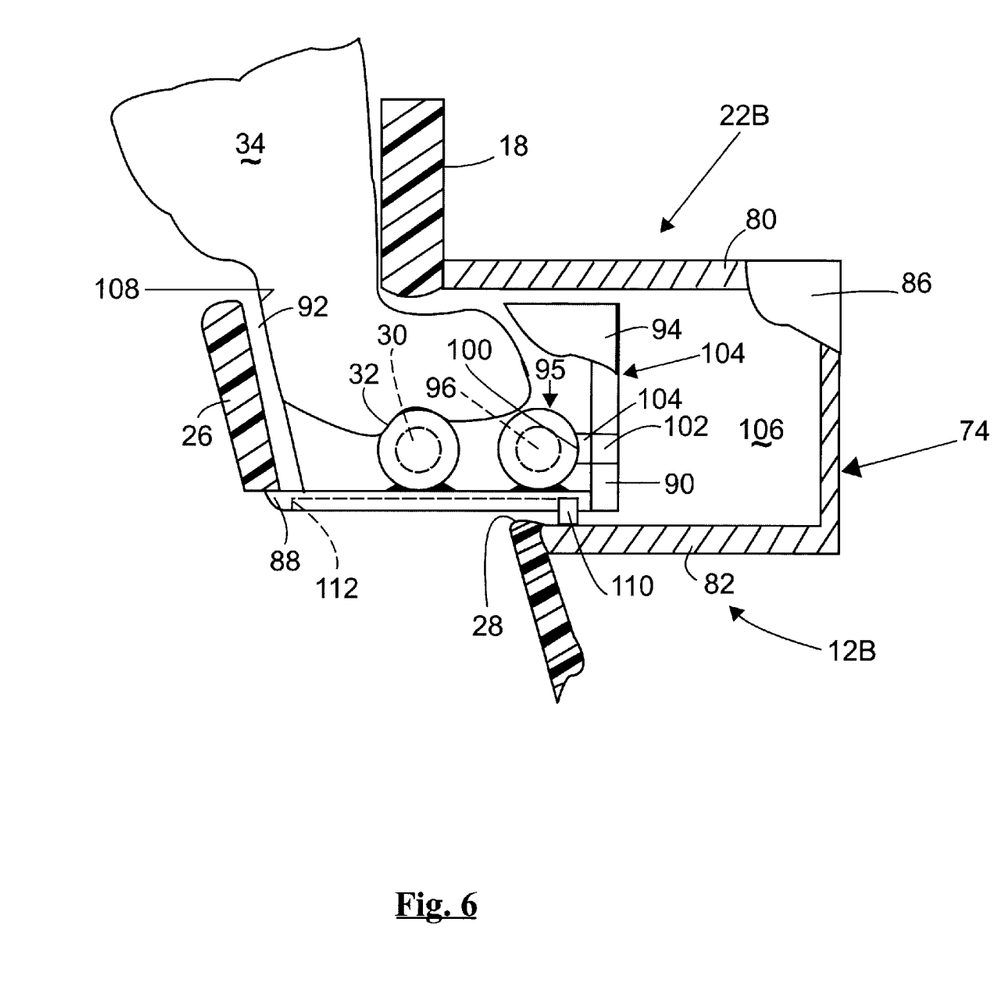
FIG. 6 is a side view, similar to FIG. 5, showing the airbag deployment assembly in an actuated condition.

With particular reference now to FIGS. 5 and 6, an alternative construction for an airbag deployment assembly 12B is shown. In general, housing 22B includes a reaction canister 74 and a drawer unit 76 retained for sliding movement within canister 74. Canister 74 is an open-ended box-like unit having a top plate 80, a bottom plate 82, a rear plate 84, and a pair of lateral side plates 86 (one partially shown in FIG. 6). Canister 74 is adapted to be fixed to dashboard 18 such that its open front end is aligned with dashboard aperture 28. Drawer unit 76 is an open-top box-like structure having a bottom plate 88, a rear plate 90, a front plate 92, and a pair of laterally-spaced side plates 94 (one partially shown in FIG. 6). A cushioned front panel 26 is fixed to front plate 92. When housing 22B is in the closed position shown in FIG. 5, drawer unit 76 is retained within canister 74 such that front panel 26 is aligned within dashboard aperture 28 to form a substantially continuous surface with the remainder of dashboard 18. Thus, with housing 22B in the closed position, the open top of drawer unit 76 is enclosed by top plate 80 of canister 74.

Airbag module 24 is shown located within drawer unit 76 with manifold 32 (or alternately the inflator 30) secured to bottom plate 88 thereof. In addition, a deployment actuator 95 is shown located in drawer unit 76. Deployment actuator 95 includes a deployment inflator 96 mounted in an optional deployment manifold 98 which, in turn, is fixed to bottom plate 88 of drawer unit 76. An output port 100 in deployment manifold 98 communicates with a discharge bore 102 extending through rear plate 90 of drawer unit 76 via a pressure conduit 104. Alternately, the outlet ports of the inflator 20 can be communicated to the discharge bore.

In operation, when crash sensor 14 of the vehicle's crash management system 10 senses a vehicular collision of sufficient magnitude to actuate airbag module 24, a signal is sent by controller 16 to activate deployment inflator 96 which generates high pressure gas that is supplied through pressure conduit 104 to pressurize a chamber 106 defined between rear plate 90 of drawer unit 76 and rear plate 84 of canister 74. Such pressurization of chamber 106 causes drawer unit 76 to slide relative to canister 74 from its closed position (FIG. 5) to its open position (FIG. 6), thereby creating a deployment aperture 108 through which airbag 34 can be deployed. A stop post 110 extending upwardly from bottom plate 82 of canister 74 is retained in a slot 112 formed in bottom plate 88 of drawer unit 76 and is adapted to engage an end surface of slot 112 for inhibiting movement of drawer unit 76 past the open position. Concurrent with, or subsequent to, activation of deployment inflator 96, controller 16 sends a signal to activate inflator 30 to inflate airbag 34. As will be appreciated, the amount of sliding travel of drawer unit 76 required to move it to the open position is limited to that necessary to create a sufficient size deployment aperture 108 through which airbag 34 can be deployed. As an alternative, a deployment actuator 95 could be installed in chamber 106 for causing movement (such as to push) of drawer unit 76 in response to activation of deployment inflator 96.

Figure 7:
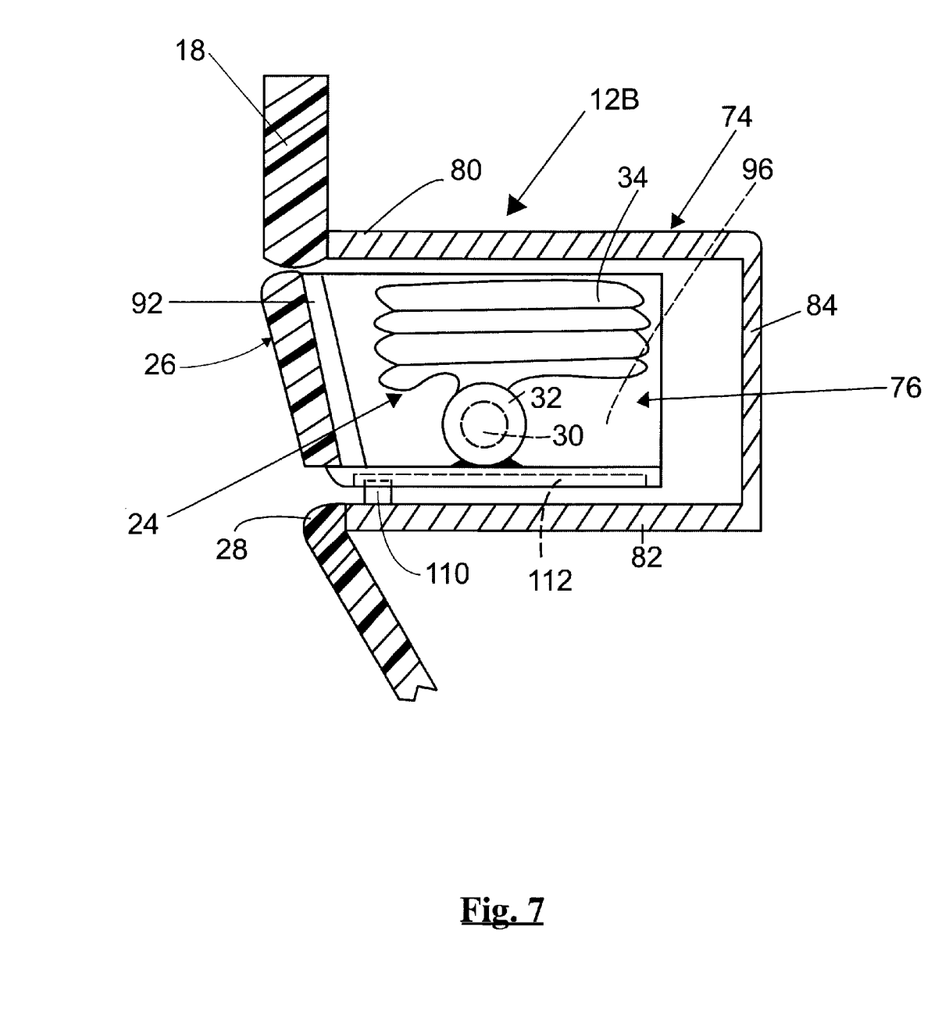
FIG. 7 is a side view showing a modified version of the airbag deployment assembly shown in FIG. 5.
Figure 8:
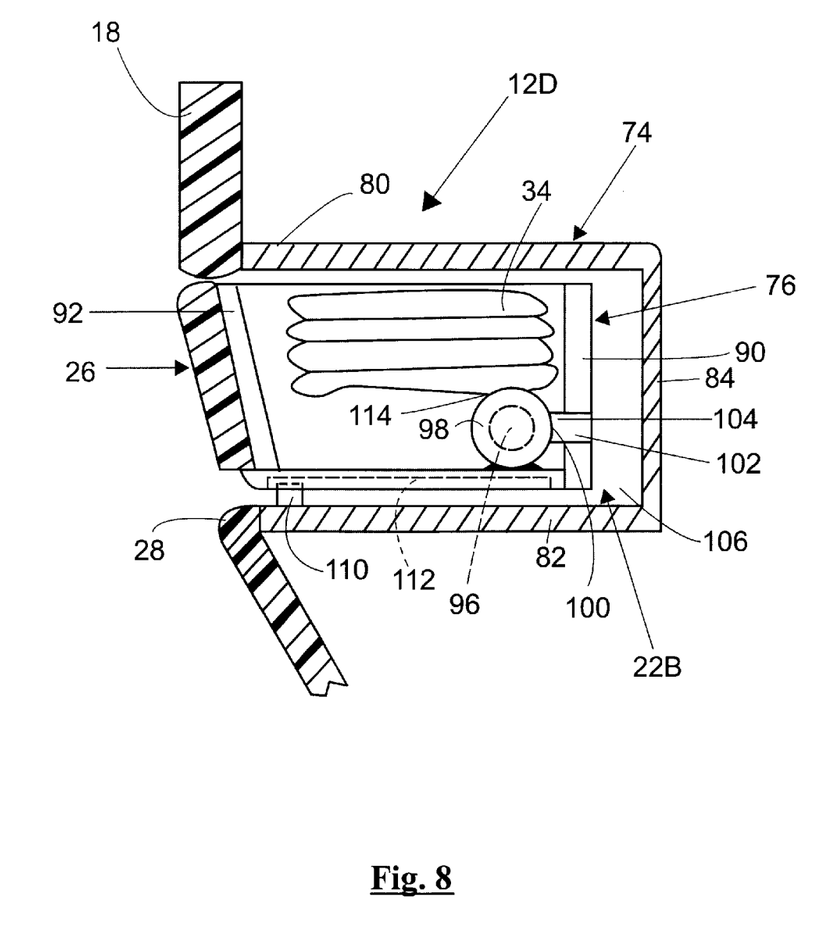
FIG. 8 is a side view showing another modified version of the airbag deployment assembly shown in FIG. 5.

As an alternative to the dual inflator arrangement described and shown in FIGS. 5 and 6, it is also contemplated that deployment actuator 95 can be eliminated such that inflation of airbag 34 via actuation of inflator 30 causes movement of drawer unit 76 from its closed position to its open position. This arrangement for an airbag deployment assembly 12C is shown in FIG. 7 and is generally similar to that shown in FIG. 5 with the exception that rear plate 90 of drawer unit 76 has been eliminated. As such, initial inflation of airbag 34 due to activation of inflator 30 in response to detection of a collision causes airbag 34 to engage rear plate 84 of canister 74 and forcibly moves drawer unit 76 to its open position. A further alternative of an airbag deployment assembly 12D is shown in FIG. 8 which is generally similar to the arrangement shown in FIG. 5 with the exception that inflator 30 and manifold 32 are eliminated and deployment manifold 98 has at least one inflation port 112 communicating with airbag 34. As such, deployment inflator 96 functions to pressurize chamber 106 for moving drawer unit 76 to its open position and to inflate airbag 34. If it is desired to first move drawer unit 76 prior to inflation of airbag 34, then a suitable valve can be installed in conjunction with manifold 98 and controlled for initially delivering gas to pressure conduit 104 and then delivering gas to inflation port 114. Actuation of such a valve could be controlled by controller 16.

Figure 9:
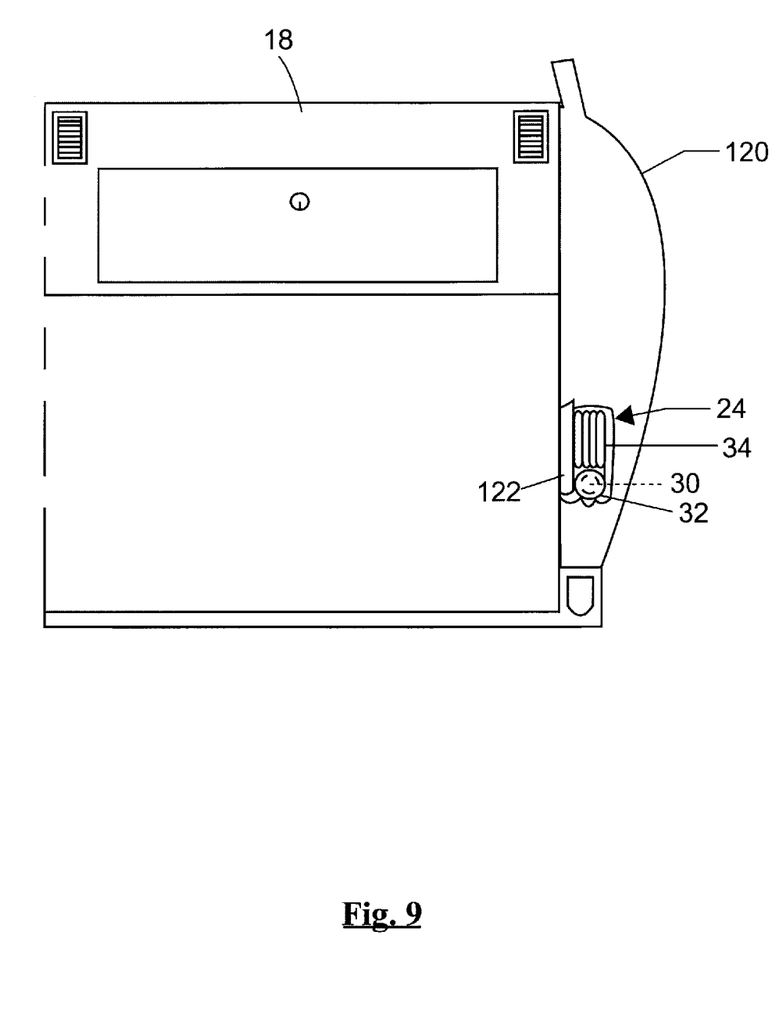
FIG. 9 is a sectional view from the passenger seat looking forward showing an airbag deployment assembly mounted in a lower portion of the vehicle door in a non-actuated condition.
Figure 10:
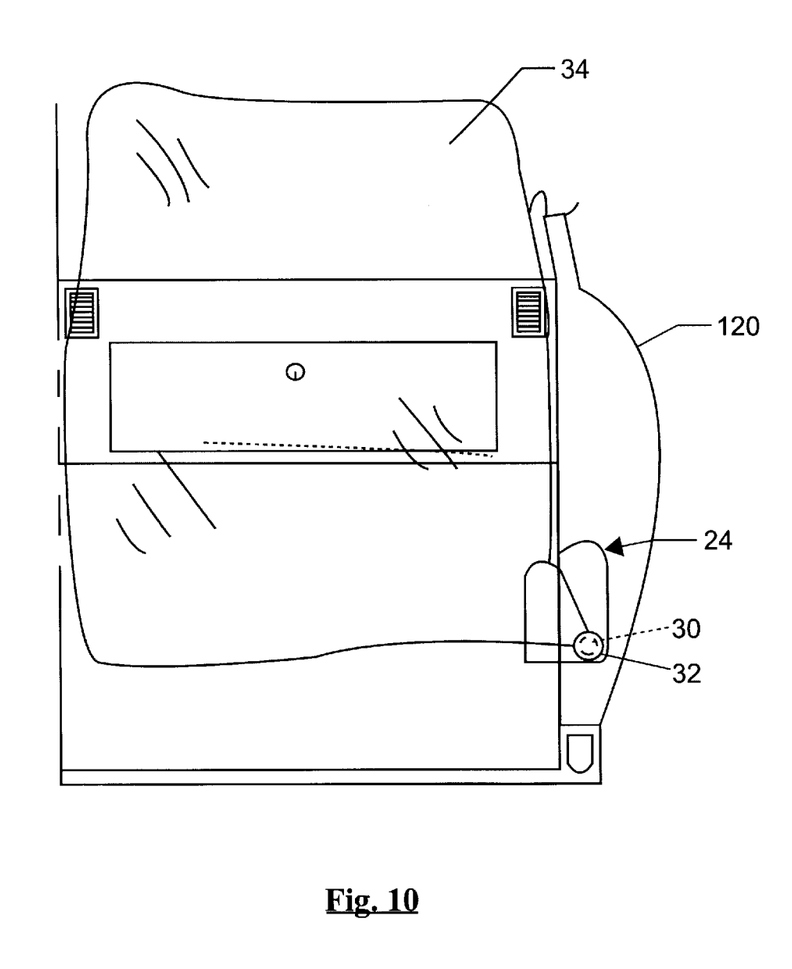
FIG. 10 is a view, similar to FIG. 7, showing the airbag deployment assembly in an actuated condition.

A further embodiment of the present invention, as shown in FIGS. 9 and 10, includes placing airbag module 24 in a low mount position within a vehicle door or in the interior trim or side wall adjacent a front fender panel of the vehicle 120. Placement of airbag module 24 in a low mount position minimizes interference with wiring or other apparatus contained within the side wall or door, while at the same time providing aesthetic benefits in such placement as well as providing added room behind the dash board 18 for other uses. Discharge of gas from inflator 30 causes airbag 34 to inflate in a direction generally outward and upward relative to the low mount position, such that airbag 34 extends from an area generally below the occupant's knees to above the occupant's head so as to cushion the occupant's lower, middle, and upper extremities during impact. It is anticipated that airbag module 24, according to this embodiment, may be mounted in a side wall of a vehicle, such as a van or a two-door automobile, so as to cushion rear-seat occupants' lower, middle, and upper extremities during impact and protected by a frangible cover 122 which is opened upon deployment of the airbag 34.

The invention being thus described, it will be obvious that the same may be varied in many ways. Accordingly, such variations are not to be regarded as a departure from the spirit and scope of the invention. Moreover, such modifications as would be obvious to one skilled in the art are intended to be included within the scope of the following claims.

I claim:

1. An airbag deployment assembly adapted for mounting to a structure within the passenger compartment of a motor vehicle, comprising:

a housing (22), including a first member and a second member, the first and second members are pivotally connected to each other, the housing is adapted to be supported relative to the structure (18), the first and second members are movable from a closed position to an open position for establishing a deployment aperture for an airbag (34); wherein the housing (22) is retained in a mounting aperture (28) formed in the structure and wherein at least one of the first and second member has a first panel secured thereto, the panel adapted to cover the mounting aperture (28) when the housing (22) is in the closed position, and wherein the relative movement of the first and second members to the open position displaces the panel to establish the deployment aperture and an airbag module (24) retained in the housing (22), the airbag module (24) includes an airbag (34) which when inflated causes the housing (22) to move from the closed position to the open position for deploying the airbag through the deployment aperture into the passenger compartment.

2. The airbag deployment assembly of claim 1 wherein the housing (22) is mounted in a lower dashboard structure (18) of the motor vehicle.

3. The airbag deployment assembly of claim 1 wherein the housing (22) is mounted in a lower portion of a vehicle structure (120) for the motor vehicle adjacent the location of a lower extremity of a seated occupant (13) such that the inflating airbag provides a protective barrier relative to the vehicle structure.

4. The airbag deployment assembly of claim 1 wherein the first member is a first pivot bracket (38) and the second member is a second pivot bracket (36), the second pivot bracket (36) is mounted for pivotal movement relative to the first pivot bracket (38) such that inflation of the airbag (34) between the first and second pivot brackets causes the second pivot bracket (36) to move from the closed position to the open position.

5. An airbag deployment assembly adapted for mounting to a structure within the passenger compartment of a motor vehicle, comprising:

a housing (22) adapted to be supported from the structure (18) for movement from a closed position to an open position for establishing a deployment aperture for an airbag (34), the housing (22) including a first pivot bracket and a second pivot bracket, the first and second pivot brackets being pivoted relative to one another; and an airbag module (24) retained in the housing (22), the airbag module (24) includes an airbag (34) and an inflator (30) which can be activated to inflate the airbag (34) which causes the housing (22) to move from the closed position to the open position for deploying the airbag through the deployment aperture into the passenger compartment;

wherein the inflator (30) is movably disposed in the housing in response to reaction forces generated upon the deployment of the airbag, and is positioned between the first pivot bracket (38) and the second pivot bracket (36) such that initial inflation of the airbag (34) causes the first and the second pivot brackets (36) to the open position to establish the deployment aperture and permit continued deployment of the airbag (34) through the deployment aperture.

6. The assembly as defined in claim 5 a first mechanism is movably disposed in the housing and operatively connected to the inflator and to the brackets and moved by the inflator to urged the brackets apart.

7. The airbag deployment assembly of claim 6 wherein an actuation member (62) is fixed to the first mechanism (30, 32) and is adapted to cause pivotal movement of at least the second pivot bracket (36) in response to activation of inflator (30).

8. The airbag deployment assembly of claim 4 wherein the first panel is fixed to the first pivot bracket (38) and a second panel (42) is fixed to the second pivot bracket (36), and wherein the panels are adapted to enclose the deployment aperture when the housing is in the closed position and to establish the deployment aperture when the housing is in the open position.

9. An airbag deployment assembly adapted for mounting to a structure within the passenger compartment of a motor vehicle, comprising:

a pivot bracket (36) mounted for pivotal movement relative to the structure from a closed position to an open position;

a panel secured to the pivot bracket (36) for establishing a deployment aperture with the structure in response to movement of the pivot bracket (36) to the open position; and an airbag module (24) retained between the panel and the pivot bracket (36), the airbag module (24) includes an airbag (34), and an inflator (30) which can be activated to generate gas for inflating the airbag (34), whereby initial inflation of the airbag (34) causes the pivot bracket (36) to move from the closed position to the open position and establish the deployment aperture through which the airbag (34) is deployed into the passenger compartment upon continued inflation thereof;

further comprising an actuator (62) operatively linked to the inflator and engageable with the pivot bracket (36) in response to inflation of the airbag (34) for forcibly moving the pivot bracket (36) to the open position.

10. The assembly as defined in claim 9 wherein the module further comprises a manifold, the inflator situated within the manifold such that inflation gas is communicated to the air bag through the manifold, wherein the actuator is operatively connected to the manifold.

11. The airbag deployment assembly of claim 9 further comprising a second pivot bracket (38) mounted for pivotal movement relative to the first pivot bracket (36), and a second panel secured to the second pivot bracket (38), and wherein the airbag module (24) is retained between the first and second pivot brackets such that initial inflation of the airbag (34) causes pivotal movement of the first and second pivot brackets to establish the deployment aperture between the first and second panels.

12. The airbag deployment assembly of claim 9 further comprising a biasing spring (46) for biasing the pivot bracket (36) toward the closed position.

13. An airbag deployment assembly adapted to be located adjacent a portion of the trim forming a portion of the dashboard within a passenger compartment of a motor vehicle, comprising:

pivot bracket means (36) mounted for pivotal movement relative to a support structure of the vehicle and movable from a closed position to an open position, the pivot bracket means located rearward of the trim;

panel means secured to the pivot bracket means (36) for providing a continuation of the trim when the pivot bracket means is in the closed position and for establishing a deployment aperture in response to movement of the pivot bracket (36) to the open position, wherein movement of the pivot bracket means and the panel means does not cause the panel means to be displaced into the passenger compartment; and airbag which when inflated urges the pivot bracket means to the open position and deploys through the deployment aperture.

* * * * *